United States Patent
Fei et al.

(10) Patent No.: US 11,113,069 B1
(45) Date of Patent: Sep. 7, 2021

(54) IMPLEMENTING QUICK-RELEASE VLV MEMORY ACCESS ARRAY

(71) Applicant: Huaxia General Processor Technologies Inc., Beijing (CN)

(72) Inventors: Xiaolong Fei, Beijing (CN); Lei Wang, Beijing (CN)

(73) Assignee: HUAXIA GENERAL PROCESSOR TECHNOLOGIES INC., Beijing (CN)

( * ) Notice: Subject to any disclaimer, the term of this patent is extended or adjusted under 35 U.S.C. 154(b) by 0 days.

(21) Appl. No.: 16/924,961

(22) Filed: Jul. 9, 2020

(51) Int. Cl.
  *G06F 9/30* (2018.01)
  *G06F 9/38* (2018.01)

(52) U.S. Cl.
  CPC ........ *G06F 9/3873* (2013.01); *G06F 9/30036* (2013.01)

(58) Field of Classification Search
  None
  See application file for complete search history.

(56) References Cited

U.S. PATENT DOCUMENTS

| | | | |
|---|---|---|---|
| 2003/0028739 A1* | 2/2003 | Li | G06F 9/5016 711/170 |
| 2011/0004566 A1* | 1/2011 | Berkowitz | G06F 16/22 705/36 R |
| 2012/0072656 A1* | 3/2012 | Archak | C12Q 1/6886 711/104 |
| 2014/0229677 A1* | 8/2014 | Kim | G06F 12/0875 711/125 |
| 2018/0260221 A1* | 9/2018 | Fong | G06F 9/3009 |
| 2019/0121868 A1* | 4/2019 | Dunne | G06F 16/355 |

* cited by examiner

*Primary Examiner* — Hyun Nam
(74) *Attorney, Agent, or Firm* — Zhong Law, LLC

(57) ABSTRACT

A method for implementing of a quick-release Variable Length Vector (VLV) memory access array in the technical field of software programs, which includes the following steps: Step 1: when a pipeline restarts to refresh an out-of-order queue each time, and the number of sending an entry recorded in a sending counter of the entry is equal to the number of returning the entry recorded in a returning counter of the entry, an ID of the entry is kept unchanged, and the ID is used for a next pushed request; Step 2: when the pipeline restarts to refresh the out-of-order queue each time, the number of sending the entry recorded in the sending counter is not equal to the number of returning the entry recorded in the returning counter and mirror resources are not exhausted, the existing entry is released, the ID, the sending counter and the returning counter of the entry are copied to another structure, and N IDs, each of which is in a non-busy status are selected from a free list, and a busy bit of each of the N IDs is set, and the N IDs are filled into an ID field of the entry; Step 3: copied request information of at least one request which is not completed is stored through the mirror resources when the pipeline restarts to refresh the out-of-order queue, and the copied request information includes an ID, a sending counter and a receiving counter of each request; Step 4: after the receiving counter is copied to the mirror resources, at least one response is continued to be monitored; Step 5: when the currently released mirror resource is the only available resource, the released ID is copied back to an entry tagged to be restarted in the same period of releasing this ID to exchange information with the entry; and Step 6: ID allocation and recovery is maintained through a free list.

7 Claims, 1 Drawing Sheet

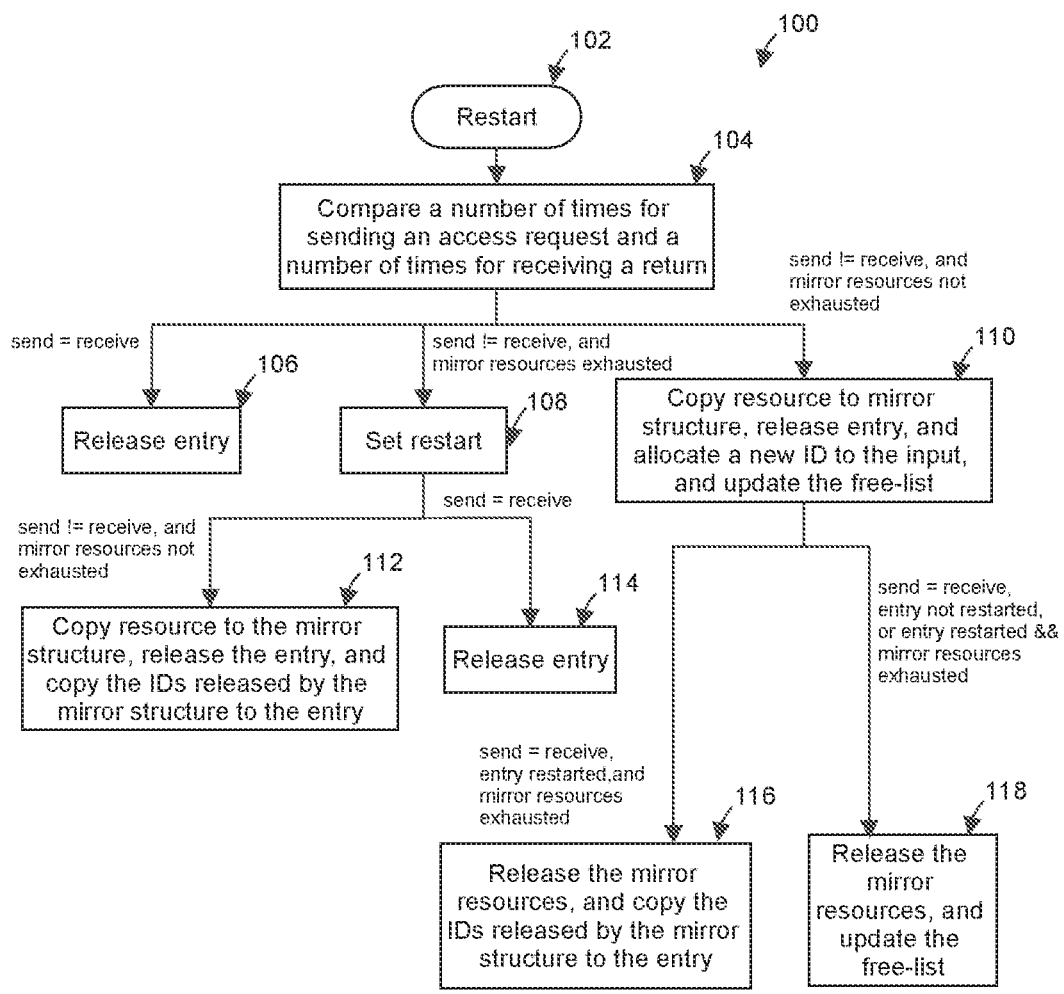

IMPLEMENTING QUICK-RELEASE VLV MEMORY ACCESS ARRAY

TECHNICAL FIELD

The present disclosure relates to the technical field of software programs, and in particular to a method for implementing a quick-release Variable Length Vector (VLV) memory access array.

BACKGROUND

Variable Length Vector (VLV) is a relatively novel architecture design of vector instructions. The VLV takes extensibility, compatibility and conciseness of a software program into account and provides a simple implementation that ensures that one instruction set meets application requirements in a long time in the future. Performance of a memory access unit of the VLV may determine the storage bandwidth of a core and may indirectly impact the execution efficiency.

The VLV supports 1-1 KB access and vector operations, and further supports out-of-order memory access of multiple loads. Once there are not enough out-of-order resources, the lack of resources may cause VLV congestion. Each time a pipeline restarts to refresh an out-of-order queue may not result in internal VLV resources to be released immediately. The release of an entry tagged with a restart mark waits until all memory access requests that had been sent out return; otherwise wrong data may be received due to mismatches of subsequent requests. If out-of-order Identifiers (IDs) are matched to out-of-order resources, hardware overhead is excessively high. Therefore, a method for implementing a quick-release VLV memory access array is provided, so as to solve above-mentioned problems.

SUMMARY

For the foregoing shortcomings, the present disclosure provides a method for implementing a quick-release VLV memory access array, so as at least to partially solve above-mentioned problems in the background section. This method can quickly release out-of-order resources and increase the utilization rate of limited hardware resources with a minimum overhead.

In order to achieve the objectives, the present disclosure provides the following technical solution. The method for implementing the quick-release VLV memory access array may include the following steps:

In Step 1, each time when a pipeline restarts to refresh an out-of-order queue, and the number of times for sending an access request for an entry recorded in a sending counter of the entry equals to the number of time for receiving return for the entry recorded in a returning counter associated with the entry, an ID associated with the entry is kept unchanged, and the ID is used for a next request pushed in.

In Step 2, each time when the pipeline restarts to refresh the out-of-order queue, the number of times for sending the access request for the entry recorded in the sending counter does not equal to the number of times for receiving the return for the entry recorded in the returning counter and mirror resources are not exhausted, the following operations are executed:

a: the current entry is released, b: the ID, the sending counter, and the returning counter of the entry are copied to another structure, and c: N IDs, each of which is in a non-busy status, are selected from a free list, and a busy bit of each of the N IDs is set, and the N IDs are filled into an ID field associated with the entry.

In Step 3, the request information of at least one uncompleted request when the pipeline restarts to refresh the out-of-order queue is copied and stored using the mirror resources, and the copied request information includes an ID, a sending counter and a returning counter of each request.

In Step 4, after the returning counter is copied to the mirror resources, at least one return response is continued to be monitored, a counting number recorded in the returning counter is increased according to the number of the at least one return response, a current mirror resource and the ID are released when a counting number recorded in the sending counter equals to the counting number recorded in the returning counter, and the free list is updated according to the released ID.

In Step 5, when the currently released mirror resource is the only available resource, the released ID is copied back to an entry tagged to be restarted in the same clock cycle of releasing this ID to exchange information with the entry.

In Step 6, ID allocation and recovery are maintained through the free list, and an ID is allocated each time when a request is pushed. The ID is recycled when the entry is normally released, or the ID is recycled when the request is completed in the mirror resources.

In some embodiments, in Step 1, each entry has an additional field configured to represent an ID of the current entry; a state of the ID of each entry is maintained through the free list; the ID of each entry sequentially increments according to 0, 1 and 2 at the beginning of power-on; the states of the first four IDs of the free list are set to be busy, and then each time when the entry is normally released, the ID is kept unchanged and the existing ID is used for the next pushed request.

In some embodiments, in Step 2, each time when receiving a restart request, a pipeline is required to reload a new instruction, and due to a delay at a front end of the pipeline, operations are not required to be completed in one clock cycle.

In some embodiments, in Step 3, an upper limit of IDs determines a receiving capability of VLV memory accesses after continuous restarts, and the design of a mirror structure configured to store uncompleted requests is also required to take into consideration an out-of-order resource and the number of the IDs.

In some embodiments, in Step 4, a small entry is required to be allocated each time; in addition, the free list is required to search one idle ID; and the free list is updated to expand the free list to support more IDs.

In some embodiments, in Step 5, once a space, corresponding to a request, of a mirror structure is released, an uncompleted request is copied from the out-of-order resource and the ID just released is allocated.

In some embodiments, in Step 6, ID allocation is not considered each time when a request is pushed, and the released entry naturally has an available ID; the ID is kept unchanged each time when the entry is normally released, and an ID in a non-busy state in the free list is allocated each time when the entry is abnormally released; and the ID is recovered when the request is completed in the mirror resources.

Compared with the related art, the present disclosure has the beneficial effects that: after the pipeline restarts to refresh the out-of-order queue, the out-of-order resource is quickly released; unnecessary resource congestions are reduced; the utilization rate of limited hardware resources is increased with a minimum overhead; both allocation and recovery processes can be completed in multiple clock cycles without influencing the performance; timing pressure is almost zero; the IDs and the mirror structure resource can be configured and flexibly regulated according to a performance requirement; and out-of-order window and release problems are simultaneously resolved.

BRIEF DESCRIPTION OF THE DRAWINGS

FIG. 1 is a flowchart of a method for implementing a quick-release VLV memory access array according to an embodiment of the present disclosure.

DETAILED DESCRIPTION

The technical solutions in embodiments of the present disclosure will be clearly and completely described below in combination with the drawings in the embodiments of the present disclosure. It is apparent that the described embodiments are only part of the embodiments of the present disclosure but not all of the embodiments. All other embodiments obtained by those of ordinary skill in the art based on the embodiments in the present disclosure without creative work shall fall within the scope of protection of the present disclosure.

The present disclosure provides a method for implementing a quick-release VLV memory access array. This method can quickly release out-of-order resources and increase utilization rate of limited hardware resources. As shown in FIG. 1, the method 100 includes the following steps.

At 102, the method may encounter an event that may require to refresh an out-of-order queue. According to an embodiment, this refresh can be achieved by a restart as described in the following. At 104, the method may compare a number of times for sending an access request for an entry recorded in a sending counter associated with the entry with a number of times for receiving return for the entry recorded in a returning counter associated with the entry.

In Step 1, each time when a pipeline restarts to refresh an out-of-order queue, and the number of times for sending an access request for an entry recorded in a sending counter associated with the entry equals to the number of times for receiving return for the entry recorded in a returning counter associated with the entry, an ID of the entry is kept unchanged, and the ID is used for a next pushed request 106.

In Step 2, each time when the pipeline restarts to refresh the out-of-order queue, the number of times for sending the access request to the entry recorded in the sending counter does not equal to the number of times for receiving return from the entry recorded in the returning counter, and mirror resources are not exhausted 110, the following special operations are executed:

a: the current entry is released, b: the ID, the sending counter and the returning counter of the entry are copied to another structure (mirror structure), and c: N IDs, each of which is in a non-busy status, are selected from a free list, and a busy bit of each of the N IDs is set; and the N IDs are filled into an ID field associated with the entry.

In Step 3, the request information of at least one uncompleted request when the pipeline restarts to refresh the out-of-order queue is copied and stored using the mirror resources, and the copied request information includes an ID, a sending counter and a returning counter of each request.

In Step 4, after the returning counter is copied to the mirror resources, at least one return response is continued to be monitored, a counting number recorded in the returning counter is increased according to the number of the at least one return response, a current mirror resource and the ID are released when a counting number recorded in the sending counter equals to the counting number recorded in the returning counter, and the free list is updated according to the released ID 118.

In Step 5, when the currently released mirror resource is the only available resource, the released ID is copied back to an entry tagged to be restarted in the same clock cycle of releasing this ID to exchange information with the entry 116.

In Step 6, ID allocation and recovery are maintained through the free list, an ID is allocated each time when a request is pushed. The ID is recycled when the entry is normally released, or the ID is recycled when the request is completed in the mirror resources.

Each time when the pipeline restarts to refresh the out-of-order queue, the number of times for sending the access request to the entry recorded in the sending counter does not equal to the number of times for receiving return from the entry recorded in the returning counter, and mirror resources are exhausted 108, the pipeline may be set to restart. The process may be repeated. At 114, when the number of times for sending an access request for an entry recorded in a sending counter associated with the entry equals to the number of times for receiving return for the entry recorded in a returning counter associated with the entry, an ID of the entry is kept unchanged, and the ID is used for a next pushed request. At 112, when the number of times for sending the access request to the entry recorded in the sending counter does not equal to the number of times for receiving return from the entry recorded in the returning counter, and mirror resources are not exhausted, a) the current entry is released, b) the ID, the sending counter and the returning counter of the entry are copied to another structure (mirror structure), and c) N IDs, each of which is in a non-busy status, are selected from a free list, and a busy bit of each of the N IDs is set; and the N IDs are filled into an ID field associated with the entry.

Through the above-mentioned method, there is not a uniquely corresponding relationship between each entry and a fixed ID. N entry IDs (N>4) are allocated to four entries, so that each entry includes an additional field configured to represent an ID of this entry. A state of the ID of each entry is maintained in the free list, and the ID of each entry sequentially increments according to 0, 1 and 2 at the beginning of power-on. States of the first four IDs in the free list are set to be busy, and then, each time when the entry is normally released (rather than a specially release during non-restart), the ID is kept unchanged and the existing ID is still used for the next pushed request. Each time when a pipeline restarts to refresh an out-of-order queue, and the number of times for sending an access request for an entry recorded in a sending counter associated with the entry equals to the number of times for receiving return for the entry recorded in a returning counter associated with the entry, an ID of the entry is kept unchanged, and the ID is used for a next pushed request. When the pipeline restarts to refresh the out-of-order queue each time, the number of sending the entry recorded in the sending counter does not equal to the number of returning the entry recorded in the returning counter and mirror resources are not exhausted, the following special operations are executed:

1: the current entry is released (a valid field of the entry is cleared),

2: the ID, the sending counter, and the returning counter of the entry, are copied to another structure, and 3: N IDs, each of which is in a non-busy status, are selected from a free list, and a busy bit of each of the N IDs is set, and the N IDs are filled into an ID field associated with the entry.

When the pipeline restarts to refresh the out-of-order queue, a small amount of information of at least one uncompleted request is transferred to another storage structure to allow the release of an out-of-order resource entity, thereby increasing resource utilization rate and camouflaging the four entries to an effect of resources of N IDs (N>4). In addition, such the storage structure further implements a trade-off solution in terms of area or timing. Each time when receiving a restart request, a pipeline is required to reload a new instruction, and due to a delay at the front end of the pipeline, above-mentioned operations are not required to be completed in one clock cycle. For example, four valid entries may be simultaneously cleared by a pipeline restart, and each entry is required to be released, so that all release work can be completed in four clock cycles. It is desirable to reuse a previous restarted flag bit when the bit for restart is set each time. And then the first entry tagged to be restarted is released according to a request sequence, so that the existing work is simplified into copying required information of an entry to another structure. Therefore, allocation and release of another mirror structure becomes fairly simple, a small entry is required to be allocated each time. In addition, the free list is also required to search an idle ID, and the free list is updated. In such a manner, the free list may be expanded to support more IDs, and the IDs become practical out-of-order resources and are not restricted by main hardware resources. In an hypothetical extreme condition that when continuous vector memory access is canceled, four entries are required to be released each time, and four additional IDs are required to be allocated to new entries, then an upper limit of the IDs determines a receiving capability of VLV memory access after continuous restarts. In addition, the design of a mirror structure configured to store uncompleted requests is also required to consider out-of-order resources and the number of the IDs. When there are totally 8 IDs and the out-of-order resources include four entries, it is unnecessary to directly copy uncompleted request information (including ID, sending counter and returning counter) to the mirror structure each time. For example, N restarts have occurred, four uncompleted requests are copied to the mirror structure, and there are left at most four available IDs. In such case, completion of the uncompleted requests may safely wait in the out-of-order resources, and once a space, corresponding to a request, of the mirror structure is released, an uncompleted request is copied from the out-of-order resources and the ID just released is allocated.

The mirror resources are configured to store copied request information of at least one uncompleted request when the pipeline restarts to refresh the out-of-order queue. The copied request information includes an ID, a sending counter and a return counter associated with each request. After the returning counter is copied to the mirror resources, at least one return response is continued to be monitored. A counting number of the returning counter is incremented according to the number of the at least one return response. A current mirror resource and the ID are released when the counting number of the sending counter equals to the counting number of the returning counter, and the free list is updated according to the released ID. When the currently released mirror resources is the only available resource, the released ID is copied back to the entry tagged to be restarted in the same clock cycle of releasing this ID to exchange information with the entry.

The free list is configured to maintain ID allocation and recovery. There are two solutions.

In the first solution, an ID is allocated each time when a request is pushed, the ID is recycled when the entry is normally released, or the ID is recycled when the request is completed in the mirror resources.

In the second solution, ID allocation is not considered each time when a request is pushed, the released entry naturally has an available ID. The ID is kept unchanged each time when the entry is normally released (that is, the request is successfully completed in the case of no restart, or the request is completed in the entry in the case of a restart), an ID in a non-busy state in the free list is allocated each time when the entry is abnormally released (in case of a restart, copying to the mirror resources for completion of the request), and the ID is recycled when the request is completed in the mirror resources.

For the second solution, when the mirror resources, the out-of-order resources and the total number of the IDs are reasonably managed and it is ensured that the mirror resources are available, available IDs may be allocated without considering the number of available IDs. For example, a result of adding mirror resources and out-of-order resources is a total number of the IDs. When the mirror resources are available or the out-of-order resources are available, the free list will certainly include idle IDs.

According to the present disclosure, problems of quick release of resources after restarts are solved. However, under a normal condition, a size of an out-of-order window is still determined by the out-of-order resources and is not influenced by the number of the IDs. When the number of the IDs is equal to the number of the out-of-order resources, the out-of-order window and release problems can be simultaneously solved at relatively high cost.

According to the present disclosure, when a request is not completed and a resource is not timely released, request tracking is maintained at minimum cost. The ID is maintained through the free list, allocation and recovery are completed in a specific stage, and two different allocation and recovery solutions, information recorded in the mirror structure and an updating time point are provided, so that the out-of-order resource can be quickly released, unnecessary resource congestions are reduced, and the utilization rate of limited hardware resources is increased with a minimum overhead.

Although the embodiments of the present disclosure have been shown and described, it is understood by those of ordinary skill in the art that various variations, modifications, replacements and transformations may be made to these embodiments without departing from the principle and spirit of the present disclosure. The scope of the present disclosure is limited by the appended claims and equivalents thereof.

What is claimed is:

1. A method for implementing a quick-release Variable Length Vector (VLV) memory access array, comprising:

each time when a pipeline restarts to refresh an out-of-order queue, and a number of times for sending an access request for an entry recorded in a sending counter associated with the entry equals to a number of times for receiving return for the entry recorded in a returning counter associated with the entry, maintaining an Identifier (ID) of the entry unchanged, wherein the ID is used for a next pushed request;

each time when the pipeline restarts to refresh the out-of-order queue, the number of times for sending the access request for the entry recorded in the sending counter does not equal to the number of times for receiving the return for the entry recorded in the returning counter, and mirror resources are not exhausted, executing operations comprising:

releasing the entry, copying the ID, the sending counter and the returning counter associated with the entry to another structure, and selecting N IDs, each of which is in a non-busy status, from a free list, setting a busy bit of each of the N IDs, and filling the N IDs into an ID field of the entry, wherein N is an integer;

storing copied request information of at least one uncompleted request when the pipeline restarts to refresh the out-of-order queue using the mirror resources, the copied request information comprising the ID, the sending counter and the returning counter of each request;

after the receiving counter is copied to the mirror resources, continuing monitoring at least one return response, increasing a counting number of the returning counter based on a count of the at least one return response, releasing a current mirror resource and the ID when the counting number of the sending counter equals to the counting number of the returning counter, and updating the free list according to the released ID;

when the currently released mirror resource is the only available resource, copying the released ID back to an entry tagged to be restarted in a same clock cycle of releasing this ID to exchange information with the entry; and maintaining ID allocation and recycling through the free list; allocating an ID each time when a request is pushed; recycling the ID when the entry is normally released, or recycling the ID when the request is completed in the mirror resources.

2. The method of claim 1, wherein each entry has an additional field configured to store the ID of the current entry, a state of the ID of each entry is maintained through the free list, the ID of each entry sequentially increments according to 0, 1 and 2 at the beginning of power-on, the states of the first four IDs of the free list are set to be busy, and then, each time when the entry is normally released, the ID is kept unchanged and the current ID is used for the next pushed request.

3. The method of claim 1, wherein, each time when receiving a restart request, a pipeline is to reload a new instruction, and due to a delay at a front end of the pipeline, operations are completed in one clock cycle.

4. The method of claim 1, wherein an upper limit of available IDs determines a receiving capability of VLV memory access after continuous restarts, and a design of a mirror structure configured to store uncompleted requests takes into consideration an out-of-order resource and the upper limit of the IDs.

5. The method of claim 1, further comprising: each time an entry is required to be allocated, searching the free list for an idle ID, wherein the free list is updated to expand the free list to support more IDs.

6. The method of claim 1, wherein once a space, corresponding to a request, of a mirror structure is released, an uncompleted request is copied from the out-of-order resource and the ID just released is allocated.

7. The method of claim 1, wherein ID allocation is not considered each time when a request is pushed, the released entry naturally has an available ID, the ID is kept unchanged each time when the entry is normally released, an ID in a non-busy state in the free list is allocated each time when the entry is abnormally released, and the ID is recycled when the request is completed in the mirror resources.

* * * * *